(12) United States Patent
Han et al.

(10) Patent No.: US 9,323,962 B2
(45) Date of Patent: Apr. 26, 2016

(54) ELECTRICAL CONNECTOR WITH GROUNDING PLATE

(71) Applicant: HON HAI PRECISION INDUSTRY CO., LTD., New Taipei (TW)

(72) Inventors: Ming-Qiu Han, Kunshan (CN); Jian-Fei Yu, Kunshan (CN); Fang-Yue Zhu, Kunshan (CN); Jin-Kui Hu, Kunshan (CN)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/262,813

(22) Filed: Apr. 28, 2014

(65) Prior Publication Data

US 2014/0322975 A1   Oct. 30, 2014

(30) Foreign Application Priority Data

Apr. 26, 2013  (CN) .......................... 2013 2 0218216

(51) Int. Cl.
*H01R 13/648* (2006.01)
*G06K 7/00* (2006.01)

(52) U.S. Cl.
CPC .................................... *G06K 7/0021* (2013.01)

(58) Field of Classification Search
CPC ....................................................... H01R 24/00
USPC ..................... 439/630, 159, 607.22
See application file for complete search history.

(56) References Cited

U.S. PATENT DOCUMENTS

| | | | |
|---|---|---|---|
| 6,840,807 B2* | 1/2005 | Ooya ................. | H01R 23/6873 439/607.01 |
| 7,011,533 B2 | 3/2006 | Miyamoto | |
| 7,014,481 B2* | 3/2006 | Miyamoto ....... | H01R 13/65802 439/95 |
| 7,780,476 B2* | 8/2010 | Sun ........................ | H01R 13/52 439/159 |
| 2005/0095917 A1* | 5/2005 | Miyamoto ....... | H01R 13/65802 439/630 |
| 2005/0282440 A1* | 12/2005 | Tseng ................. | H01R 13/641 439/630 |
| 2006/0116027 A1* | 6/2006 | Tseng ................. | G06K 7/0021 439/630 |
| 2009/0246993 A1* | 10/2009 | Yu ........................ | H01R 13/633 439/159 |
| 2010/0087074 A1* | 4/2010 | Yu ........................ | G06K 7/0021 439/81 |
| 2010/0267260 A1* | 10/2010 | Yu ........................ | G06K 13/08 439/159 |
| 2010/0267267 A1* | 10/2010 | Zhou ................ | H01R 13/65802 439/328 |

(Continued)

*Primary Examiner* — Abdullah Riyami
*Assistant Examiner* — Nader J Alhawamdeh
(74) *Attorney, Agent, or Firm* — Wei Te Chung; Ming Chieh Chang

(57) ABSTRACT

An electrical connector comprises an insulative housing, a plurality of contacts retained in the insulative housing and a metal shell enclosing the insulative housing. The insulative housing has a inserting slot. The contacts include a plurality of grounding contacts and signal contacts, the contacts each comprise a retaining portion retained in the insulative housing, a contacting portion extending forwardly from a side of the retaining potion and extending into the inserting slot and a soldering portion extending from the other side of the retaining portion. The shield shell has a top wall covering a top of the insulative housing and the shield shell comprising at least a pair of resisting arms, the pair of resisting arms resisting the two sides of the grounding contact along a left-to-right direction.

17 Claims, 4 Drawing Sheets

(56) References Cited

U.S. PATENT DOCUMENTS

| | | | | |
|---|---|---|---|---|
| 2011/0136360 A1* | 6/2011 | Zhu | G06K 13/0837 439/159 |
| 2011/0159739 A1* | 6/2011 | Li | H01R 12/714 439/629 |
| 2011/0230072 A1* | 9/2011 | Yu | H01R 12/7094 439/159 |
| 2011/0294323 A1* | 12/2011 | Yu | H01R 13/635 439/159 |
| 2012/0178302 A1* | 7/2012 | Yu | H01R 13/635 439/631 |
| 2012/0231647 A1* | 9/2012 | Yu | H01R 12/716 439/325 |
| 2012/0252276 A1* | 10/2012 | Zhu | H01R 12/716 439/630 |
| 2013/0102171 A1* | 4/2013 | Zhu | G06K 13/0825 439/157 |
| 2013/0337672 A1* | 12/2013 | Zhu | H01R 13/6335 439/159 |

* cited by examiner

ELECTRICAL CONNECTOR WITH GROUNDING PLATE

BACKGROUND OF THE INVENTION

1. Field of The Invention

The present invention generally relates to an electrical card connector and more particularly to an electrical connector with a metal shell.

2. Description of Related Art

U.S. Pat. No. 7,011,533B2, published on Mar. 14, 2006, discloses an electrical card connector including an insulative housing, a plurality of contacts retained in the insulative housing and a metal shell enclosing the insulative housing, the contacts include a plurality signal contact and a plurality of grounding contact. The contacts each comprise a retaining portion retaining in the insulative housing, a connecting portion extending from the retaining portion, a contacting portion extending downwardly from an end of the connecting portion and a soldering portion extending backwardly outwardly of the insulative housing. The shield shell has a top wall having a opening and a grounding plate located on a top of the each signal contact and grounding contact. When an electrical card inserting into the connector, the contacts pass through the opening and contact with the grounding plate of the shield shell to improve signal transmission quality of the electrical connector. But, this can make the grounding contact would be deformation by the grounding plate and the electrical card.

So, an improved connector is needed.

SUMMARY OF THE INVENTION

The present invention provides an electrical connector, which comprises an insulative housing, a plurality of contacts retained in the insulative housing and a metal shell enclosing the insulative housing. The insulative housing has a inserting slot. The contacts include a plurality of grounding contacts and signal contacts, the contacts each comprise a retaining portion retained in the insulative housing, a contacting portion extending forwardly from a side of the retaining potion and extending into the inserting slot and a soldering portion extending from the other side of the retaining portion. The shield shell has a top wall covering a top of the insulative housing and the shield shell comprising at least a pair of resisting arms, the pair of resisting arms resisting the two sides of the grounding contact along a left-to-right direction.

Other objects, advantages and novel features of the present invention will become more apparent from the following detailed description of the present embodiment when taken in conjunction with the accompanying drawings.

DETAILED DESCRIPTION OF THE INVENTION

Figure 1:
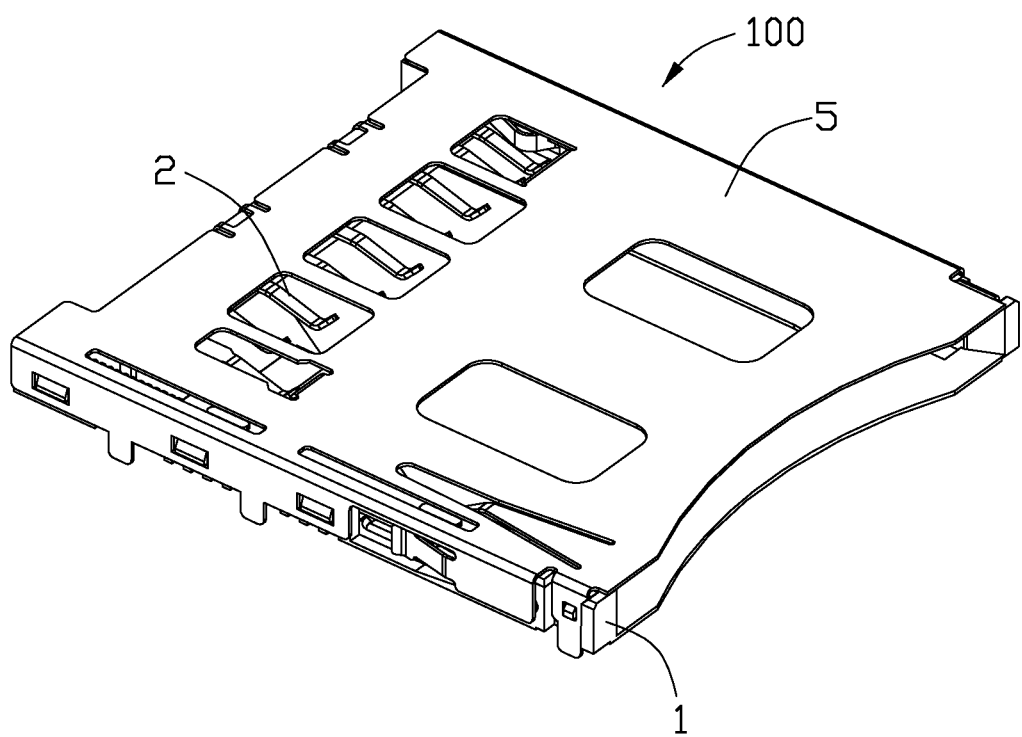
FIG. 1 is an assembled perspective view of an electrical card connector according to a preferred embodiment of the present invention.

Reference will now be made to the drawing figures to describe the preferred embodiment of the present invention in detail.

Figure 2:
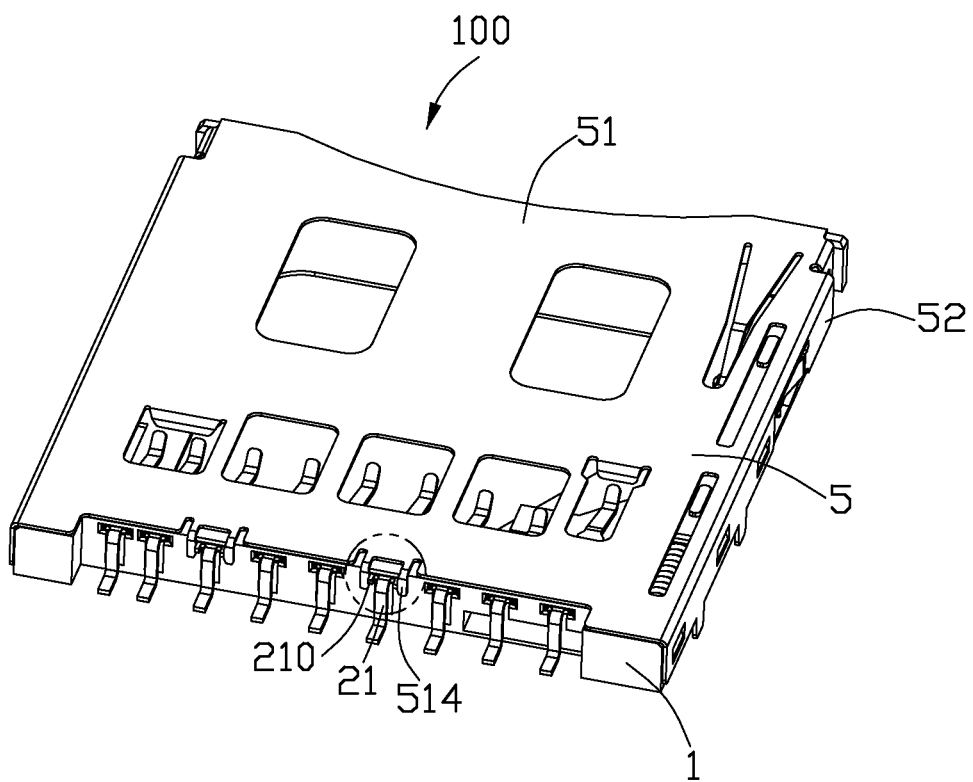
FIG. 2 is another assembled perspective view of the electrical card connector as shown in FIG. 1, taken from another side.
Figure 3:
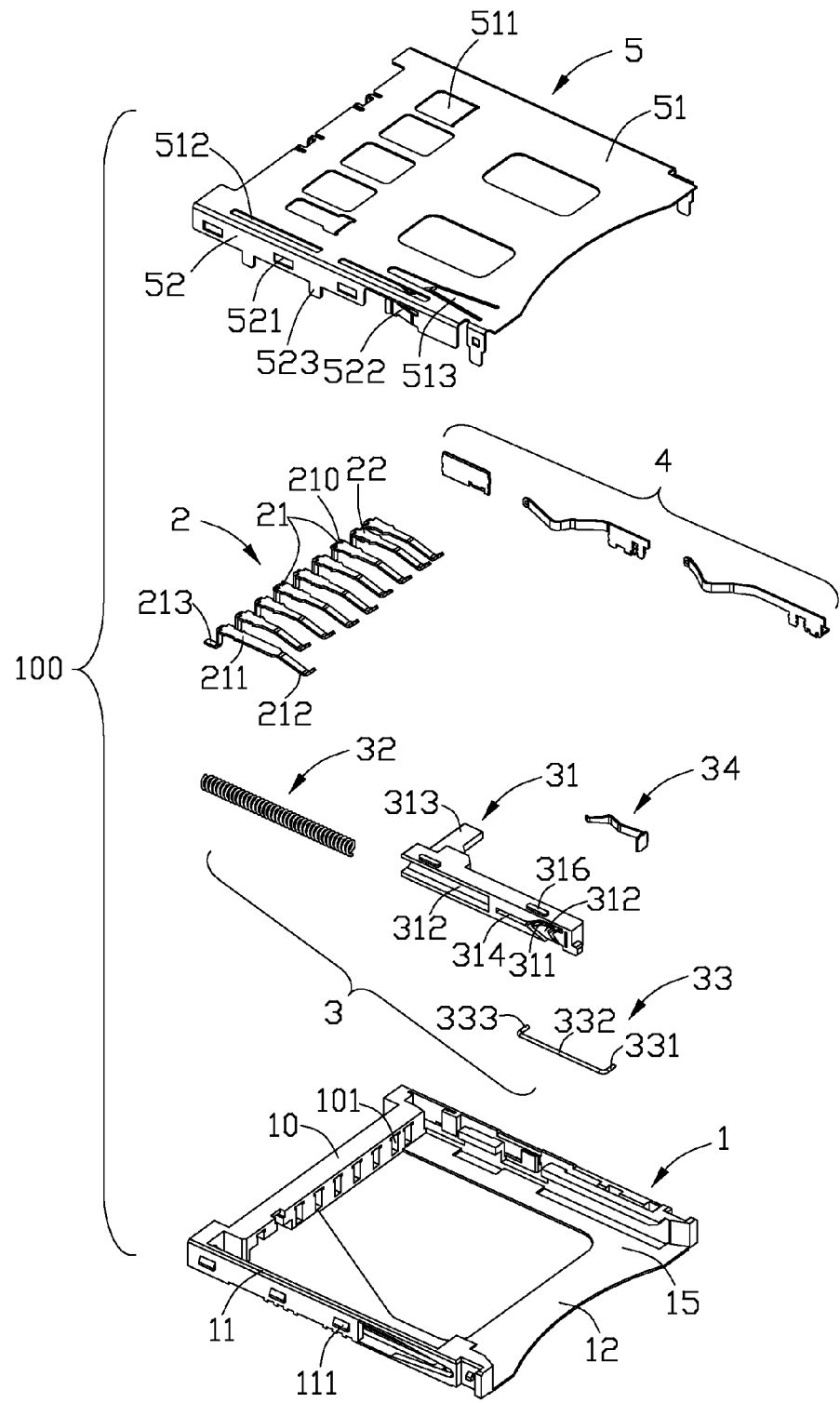
FIG. 3 is an exploded perspective view of the electrical card connector.

Referring to FIGS. 1-3, an electrical card connector 100 includes an insulative housing 1, a plurality contacts 2 received in the insulative housing 1, an ejector 3 assembled to the insulative housing 1, a group of switching contacts 4 and a shield shell 5 enclosed the insulative housing 1.

Referring to FIG. 3, the insulative housing 1 includes a base portion 10, two side portions 11 extending from two sides of the base portion 10, a bottom wall 12 connecting with two side portions 11 and a inserting slot 15 surrounding by the base portion 10, two side portion 11 and the bottom wall 12 for receiving an electrical card. The base portion 10 has a plurality of retaining slots 101 passing therethrough along a front to rear direction. The side portions 11 each have a plurality of locking blocks 111 extending outwardly therefrom.

The contacts 2 include nine contacts, the fourth and seventh contacts are grounding contacts 21 and another contacts are signal contacts 22. The contacts 2 each have a retaining portion 211 retaining in the retaining slot 101 of the insulative housing 1, a contacting portion 212 extending forwardly from a side of retaining portion 211 and extending into the inserting slot 15 and a soldering portion 213 extending downwardly firstly and then extending backwardly form the other side of the retaining portion 211. In a left to right direction, a width of the retaining portion 211 is wider than a width of the soldering portion 213. Each of the grounding contacts 22 has a pair of engaging arms 210 extending backwardly from the retaining portion 211 and located on two sides of the retaining portion 211. The soldering portions 213 each are located in the middle of the engaging arms 210 and have a pair of gaps/notches (not labeled) with the corresponding engaging arms 210, respectively. Notably, free ends of the engaging arms form the linking position with the raw contact strip/carrier before the contact is inserted into the retaining slot 101 of the housing and broken from the contact carrier.

The ejector 3 is assembling in the side portion 11. The ejector 3 has a slider 31 moving along a front-to-back direction, a spring 32 disposed between the insulative housing 1 and the slider 31, a guiding post 33 assembling to the insulative housing 1 and the slider 31 and a locking plate 34 retained inside of the slider 31.

Referring to FIGS. 2-3, the shield shell 5 includes a top wall 51 covering upon the inserting slot 15, a pair of side walls 52 extending downwardly from two sides of the top wall 15. The top wall 15 has a plurality of openings 511 for affording the contacting portion 212 of the contacts 2 passing therethrough upwardly. Two guiding slots 512 are defined in a left side of the shield shell 5 and arranged along a front to back direction. A resisting plate 513 defined in a right side of the guiding slots 512 and extending incline and downwardly into the inserting slot 15. The side walls 52 each have a plurality of latching holes 521 cooperating with the locking blocks 111 of the insulative housing 1. The left side wall 52 includes an electric plate 522 extending inclined to the inserting slot 15 for resisting the guiding post 33. The side walls 52 also have a plurality of mounting plates 523 mounting into a printed circuit board (not shown) of the electrical card connector 100. The mounting plates 523 are each used as a soldering tail for contacting with the ground. The resisting plate 513 presses the slider 31 downwardly to prevent the slider 31 from leaving out of the insulative housing 1.

Figure 4:
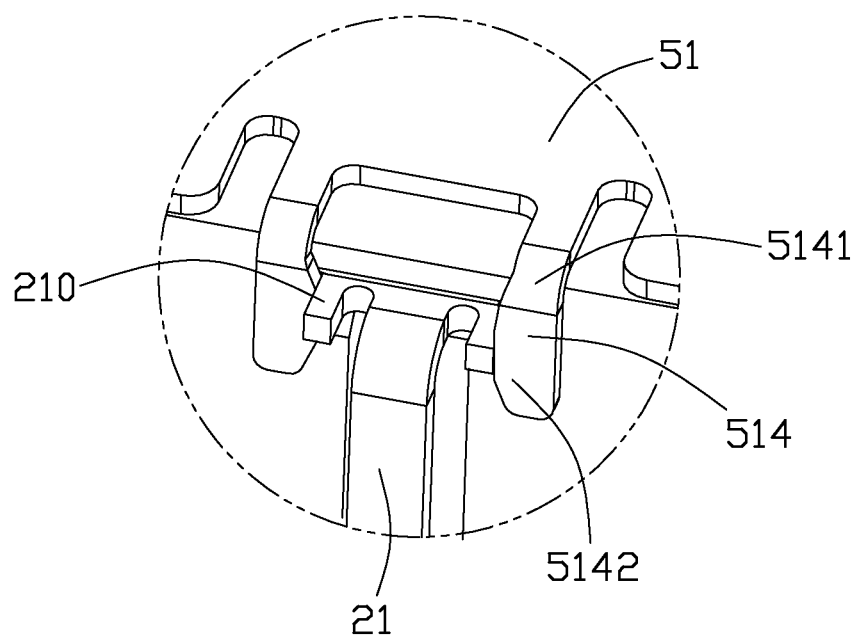
FIG. 4 is an enlarged view of a part of the electrical card connector shown in FIG. 2.

Referring to FIG. 4 and combining with FIG. 2, the top wall 51 of the shield shell 5 includes a plurality of resisting arms 514. The pair of the resisting arms 514 have the grounding contact 21 located in the middle thereof The resisting arms 514 include a connecting portion 5141 extending backwardly from a rear edge of the top wall 51 and a resisting portion 5142 extending downwardly and vertically from the connecting portion 5141. Each pair of the resisting portions 5142 each have an arc-shaped convex extending inside thereof The pair of resisting portion 5142 abut against the engaging arms 210 located in two sides of the grounding contact 21 in left and right directions to assist the grounding contact 21 to be grounded. Understandably, each of contacts has the similar structure with the engaging arms 210 for linking to the contact carrier before assembled into the housing. Anyhow, only the grounding contact has the corresponding engaging arms 210 exposed outside of the housing for being easily mechanically grasped by the corresponding resisting arms 514 of the shell enclosing the housing. On the other hand, because both the pair of resisting arms 514 and the pair of engaging arm 210 are resilient in a lateral direction, the preferable engagement therebetween in the lateral direction may be achieved.

The grounding contacts 21 of the electrical card connector 100 is grounded via the shield shell 5. The pair of engaging arms 210 of the grounding contacts 21 resist the resisting arms 514 of the shield shell 5 to prevent the grounding contacts 21 from warping by the excessive force.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical card connector comprising: an insulative housing having an inserting slot; a plurality of contacts retained in the insulative housing, the contacts including a plurality of grounding contacts and signal contacts, wherein the contacts are nine, the grounding contacts are fourth and seventh from left to right direction, the contacts each comprising a retaining portion retained in the insulative housing, a contacting portion extending forwardly from a side of the retaining potion and extending into the inserting slot and a soldering portion extending from the other side of the retaining portion; a shield shell covering upon the insulative housing, the shield shell having a top wall covering a top of the insulative housing in a vertical direction;
the shield shell comprising at least a pair of resisting arms, the pair of resisting arms clamping two opposite sides of the grounding contact along a left-to-right direction perpendicular to the vertical direction.

2. The electrical card connector as claimed in claim 1, wherein a width of the soldering portion along the left-to-right direction is wider than a width of the retaining portion, the grounding contact has two engaging arms extending backwardly from the retaining portion and located in two sides of the retaining portion, the resisting arm abut against the engaging arm.

3. The electrical card connector as claimed in claim 2, wherein the soldering portion is located in the middle of the two engaging arms, a gap is located between the soldering portion and the engaging arms.

4. The electrical card connector as claimed in claim 2, wherein the grounding contacts are two, the resisting arms abut against the each of the engaging arms of the grounding contacts along a left to right direction.

5. The electrical card connector as claimed in claim 1, wherein the resisting arms each include a connecting portion extending backwardly and bending from a rear edge of the top wall and a resisting portion extending downwardly and vertically from the connecting portion.

6. An electrical card connector comprising: an insulative housing having an inserting slot; a plurality of contacts retained in the insulative housing and extending outwardly of the insulative housing; a shield shell covering upon the insulative housing in a vertical direction and having at least a pair of resisting arms, the pair of resisting arms clamping two opposite sides of one of the contacts in a transverse direction perpendicular to said vertical direction, wherein the contacts include a plurality of grounding contacts, the pair of the resisting arms clamping on said two opposite sides of one of the grounding contacts; wherein the contacts are nine, the grounding contacts are fourth and seventh from left to right direction.

7. The electrical card connector as claimed in claim 6, wherein the contacts each comprise a retaining portion retained in the insulative housing, a contacting portion extending forwardly from a side of the retaining potion and extending into the inserting slot and a soldering portion extending from the other side of the retaining portion, the contacts each having a pair of engaging arms extending backwardly from the retaining portion and located on two opposite sides of the retaining portion, the soldering portions each being located in the middle of the engaging arms.

8. The electrical connector as claimed in claim 7, wherein a gap defined between the engaging arm and the soldering portion, and the pair of the resisting arms resist against the engaging arms.

9. An electrical connector comprising: an insulative housing defining a plurality of passageways therein; a plurality of contacts disposed in the housing and categorized with grounding contacts and signal contacts, wherein the contacts are nine, the grounding contacts are fourth and seventh from left to right direction, each of said grounding contacts including a tail section sandwiched between a pair of engaging arms via a pair of gaps therebetween in a transverse direction, said pair of engaging arms being originally linked to a contact carrier before the contact is inserted into the corresponding passageway and is successively cut away from the contact carrier at free ends thereof; a metallic shell enclosing said housing in a vertical direction perpendicular to said transverse direction and forming a pair of resisting arms laterally and inwardly clamping the pair of engaging arms therebetween in said transverse direction for grounding.

10. The electrical connector as claimed in claim 9, wherein said pair of engaging arms are exposed outside of a rear face of the housing in a front-to-back direction perpendicular to both said vertical direction and said transverse direction.

11. The electrical connector as claimed in claim 10, wherein said pair of resisting arms extend downwardly in a vertical plane along said vertical direction.

12. The electrical connector as claimed in claim 9, wherein each of said resisting arms forms an inward protrusion in the transverse direction to contact the corresponding engaging arm.

13. The electrical connector as claimed in claim 10, wherein each of the signal contacts lacks said pair of engaging arms exposed outside of the rear face of the housing.

14. The electrical connector as claimed in claim 9, wherein each of said grounding contacts further includes a retaining portion fixed to the housing, and a contacting portion, and wherein the engaging arms and the contacting portion are located by opposite sides of the retaining portion and opposite to each other in the front-to-back direction.

15. The electrical card connector as claimed in claim 1, wherein each of said signal contacts lacks said two engaging arms exposed outside of the housing.

16. The electrical card connector as claimed in claim 1, wherein the resisting arms and the contacting portion are located by two opposite sides of the corresponding retaining portion and opposite to each other along a front-to-back direction which is perpendicular to both said vertical direction and said left-to-right direction.

17. The electrical card connector as claimed in claim 6, wherein said one of the contacts includes a retaining portion fixed to the housing, and a contacting portion, and wherein the resisting arms and the contacting portion are located by opposite sides of the retaining portion and opposite to each other in the front-to-back direction.

* * * * *